(12) United States Patent
Le Bars et al.

(10) Patent No.: US 10,133,605 B2
(45) Date of Patent: Nov. 20, 2018

(54) DETERMINING A COMPUTING CAPACITY OF ONE OF A PHYSICAL OR A VIRTUAL MACHINE

(71) Applicant: Harmonic, Inc., San Jose, CA (US)

(72) Inventors: Eric Le Bars, Geveze (FR); Arnaud Mahe, Poligne (FR); Christophe Berthelot, Erce-pres-Liffre (FR); David Henry, Dourdain (FR)

(73) Assignee: Harmonic, Inc., San Jose, CA (US)

( * ) Notice: Subject to any disclaimer, the term of this patent is extended or adjusted under 35 U.S.C. 154(b) by 189 days.

(21) Appl. No.: 15/261,921

(22) Filed: Sep. 10, 2016

(65) Prior Publication Data
US 2017/0075731 A1 Mar. 16, 2017

(30) Foreign Application Priority Data
Sep. 11, 2015 (EP) .................................. 15306385

(51) Int. Cl.
*G06F 9/46* (2006.01)
*G06F 9/50* (2006.01)
*G06F 11/34* (2006.01)

(52) U.S. Cl.
CPC .......... *G06F 9/5044* (2013.01); *G06F 9/505* (2013.01); *G06F 9/5077* (2013.01); *G06F 11/3414* (2013.01); *G06F 11/3428* (2013.01); *G06F 11/3442* (2013.01); *G06F 11/3419* (2013.01); *G06F 11/3433* (2013.01); *G06F 2201/805* (2013.01); *G06F 2201/81* (2013.01); *G06F 2201/815* (2013.01); *G06F 2209/501* (2013.01); *G06F 2209/5022* (2013.01)

(58) Field of Classification Search
None
See application file for complete search history.

(56) References Cited

U.S. PATENT DOCUMENTS

| | | | | |
|---|---|---|---|---|
| 5,794,036 A | * | 8/1998 | Gomi | G06F 9/5083 713/500 |
| 2008/0280623 A1 | * | 11/2008 | Danne | H04W 28/08 455/453 |
| 2013/0160014 A1 | * | 6/2013 | Watanabe | G06F 9/50 718/1 |
| 2015/0067019 A1 | * | 3/2015 | Balko | H04L 67/10 709/202 |
| 2015/0192979 A1 | * | 7/2015 | Ghose | G06F 1/20 713/320 |
| 2016/0224394 A1 | * | 8/2016 | Farhan | H04L 67/1002 |
| 2016/0239322 A1 | * | 8/2016 | Watanabe | G06F 9/45558 |

* cited by examiner

*Primary Examiner* — Kenneth Tang
(74) *Attorney, Agent, or Firm* — Brokaw Patent Law PC; Christopher J. Brokaw (57) ABSTRACT

The estimation of a computing capacity of a machine. The computing capacity is estimated by iteratively adding and removing calibrated computer processes on the machine, and performing a sum of computing loads of processes that execute on the machine. In order to characterize the ability of a machine to run in parallel a number of processes having a defined computing load, the processes are associated to a condition of success.

21 Claims, 4 Drawing Sheets

PRIOR ART

DETERMINING A COMPUTING CAPACITY OF ONE OF A PHYSICAL OR A VIRTUAL MACHINE

CLAIM OF PRIORITY

The present patent application claims priority to European Patent Application No. EP 15306385.4, filed Sep. 11, 2015, entitled "Method for Determining a Computing Capacity of one of a Physical or a Virtual Machine," the entire disclosure of which is hereby incorporated by reference for all purposes as if fully set forth herein.

FIELD OF THE INVENTION

Embodiments of the invention generally relate to the management of execution environments, and more generally, relate to the determination of machine capacity for the performance of multimedia processing tasks.

BACKGROUND

In the field of computing, a virtual machine (VM) is an emulation of a particular computer system. Virtual machines operate based on the computer architecture and functions of a real or hypothetical computer. Virtual machines may be implemented using specialized hardware, software, or a combination of both.

Classification of virtual machines can be made based on the degree to which they implement functionalities of specific real machines. In this way, system virtual machines (also known as full virtualization VMs) provide a complete substitute for the specific real machine and a level of functionality required for the execution of a complete operating system.

The use of VMs provides great flexibility in the handling of tasks which are executed in parallel. Indeed, VMs can be created and deleted to meet the needs of processing tasks that evolve and change over time. Moreover, VMs provide great flexibility in creating machines with desired properties since the actual characteristics of a VM are a combination of software characteristics and characteristics of the hardware machine on which the VM is executed.

This flexibility is especially useful in multimedia processing. Multimedia tasks are known to require significant resources. Virtual machines may be created to possess resources just sufficient to execute a multimedia task. In a multimedia head-end server, VMs can be created dynamically upon the request of clients to obtain a multimedia service.

When creating a virtual machine, it is possible to adjust the parameters of the virtual machine, such as CPU, RAM, or bandwidth. The resources allocated to a virtual machine may then be reserved on the host hardware machine. For example, when creating a VM with 4 GB RAM, 4 GB of RAM will be reserved for this VM on the host hardware machine in order to ensure that the VM will have enough RAM to operate. Thus, the sum of all resources reserved by the VMs on a host machine cannot exceed the resources of the host machine, and the reservation of resources for a VM mitigates the ability of the hardware machine to host additional VMs for performing further multimedia processing.

It is advantageous to dispatch processing tasks amongst the available machines such that they have the least possible unused resources. To achieve this goal, it is desirable to obtain, for processing tasks to be executed, an evaluation of the resources needed to perform the task, and for machines, an evaluation of their available resources.

This is especially true for multimedia processing, in which many tasks are generally computationally-intense and need to be performed in real time to produce a target level of quality. For example, it is possible to encode video content with different levels of quality. More resources are usually needed for higher levels of quality. It is usually necessary to perform more complex video coding decisions to improve the quality of video at an equivalent bitrate. A VM thus needs a minimum amount of resources to perform video encoding in real time at a desired level of quality.

The usual method for defining the resources of a machine relies upon an evaluation a priori of the resources necessary to perform a task. Although this works for simple calculation tasks, it is almost impossible to calculate a priori the resources necessary to perform multimedia processing. Indeed, the ability to perform a task depends upon complex interactions between CPU, memory, and the like. Moreover, the ability to perform multimedia processing with a desired level of quality in real time is highly dependent on the content of the multimedia streams to be processed. For example, the resources necessary to encode a video scene increase with the resolution of the scene; however, the resources necessary to encode a video scene also depends upon the content of the scene. For example, video scenes comprising water and waves are known to be highly difficult to encode, both in terms of encoding time and compression levels. Other parameters such as the frame rate or encoding parameters have an impact on the resources necessary to encode a video, which renders an a priori evaluation of the performance of a machine even more difficult.

Another possible method to overcome this issue involves calculating, for a given multimedia task, the minimum required amount of resources by running the task and observing the footprint of the execution of the task. However, this method may only be used with machines with standardized configurations, and is not well suited for use with virtual machines, as by their nature virtual machines have flexibility in their allocated resources, while results in uncertainty about the actual capacity of a VM in use.

BRIEF DESCRIPTION OF THE DRAWINGS

Embodiments of the invention will be better understood and its various characteristics and advantages will emerge from the following description of a number of exemplary embodiments and its appended figures in which.

DETAILED DESCRIPTION OF THE INVENTION

In this specification, embodiments of the invention will be described by way of examples related to multimedia processing. However, the invention is not restricted to these examples and can be applied to other types of applications.

The approaches discussed herein are particularly suitable for complex applications, and virtual machines whose behavior depends not only on the nominal performances of the machine, but also on the interactions between the virtual machine and the hardware machine on which it is executed.

Figure 1:
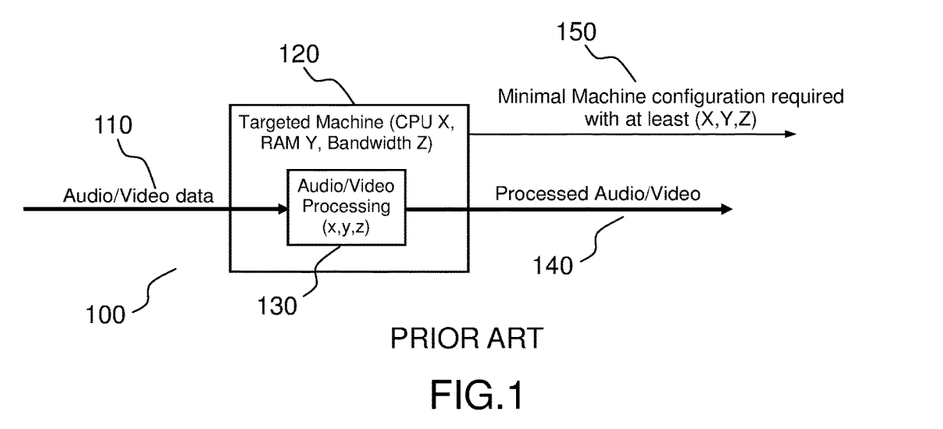
FIG. 1 is an illustration of determining the available resources on a machine according to the prior art.

FIG. 1 is an illustration of determining the available resources on a machine according to the prior art. The principle of prior art methods apply on a given type of machine, a type of machine being defined for example by the architecture of the CPU, the type of memory it is equipped with, and the nature of the machine (hardware, virtual machine, and the like).

The prior art method consists in executing a multimedia process 130 on a target machine 120. The multimedia process 130 takes multimedia data 110 as input and outputs processed multimedia data 140. The execution of the multimedia process 130 on the machine 120 allows the calculation of a minimal machine configuration 150 necessary to execute the processing 130. The calculation of the minimal machine configuration 150 can be performed by observing the minimum resources needed by the multimedia process 130 to execute. The minimum resources comprise, for example, a minimum CPU, a minimum memory, and a minimum bandwidth. For example, the minimum CPU resources to execute multimedia process 130 can be judged by observing the maximum CPU used by multimedia process 130 when executing on target machine 120.

This method enables the determination of the minimum resources necessary to execute a multimedia process. However, this prior art method can only be performed using a predefined, standard type of platform. Indeed, the execution of a process is highly dependent upon the type of machine. Consequently, this prior art method is not practicably available for use with virtual machines, whose characteristics can so wildly fluctuate.

Indeed, the flexibility available when creating virtual machines allows new types of machines to be created. For example, even if a virtual machine is defined by, amongst other resources, a nominal CPU and a nominal amount of memory, the actual behavior of this virtual machine may vary in practice depending on the characteristics of the physical machine on which the virtual machine executes.

Figure 2:
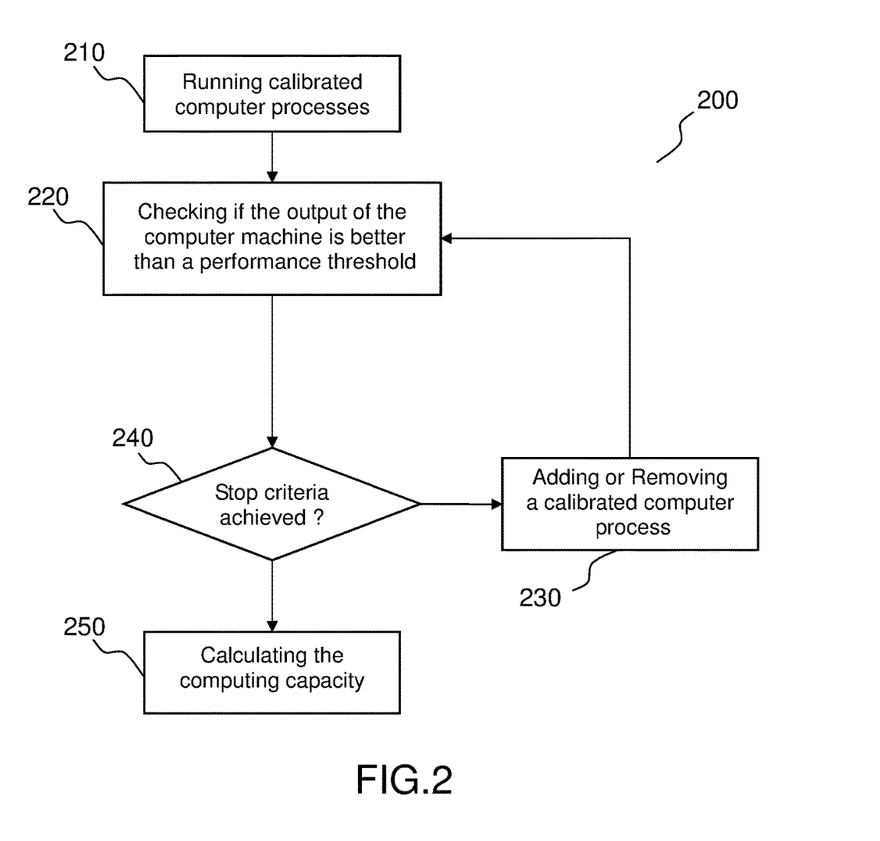
FIG. 2 is a flowchart depicting the process of determining the computing capacity of a machine according to an embodiment of the invention.

FIG. 2 is a flowchart depicting the process 200 of determining the computing capacity of a machine according to an embodiment of the invention. Process 200 comprises executing 210 on the computing machine a number of calibrated computer processes. Each of the computer processes being executed has a calibrated computing load. A calibrated computing load is defined by one or more of a CPU load, a memory load, or a bandwidth load. A calibrated computing load has a number of values.

Process 200 is particularly well-suited for estimating a computing capacity of a virtual machine, but process 200 may also be used for calculating a computing capacity of a physical machine or other execution environments, such as a Linux Container, which allows different operating system instances to execute on different partitions of a physical machine.

These calibrated computer processes may, for example, be multimedia processes which perform tasks such as video encoding, video transcoding, audio encoding, DRM application, and the like. The calibrated computing load is representative of the resources necessary to run a process in real time. In multimedia processing, and more specifically in video processing, the resources needed to perform a task are dependent not only on the task itself, but also on input data, on parameters to perform a task, and the required result.

For example, the resources required to encode a video are dependent on the complexity of the video codec used (by means of example, encoding a video in H.265 is known to be more complex than in H.264), the parameters of encoding, the characteristics of the input video (e.g., resolution, bit depth, brightness, type of scene, and the like), and on the level of quality to achieve. It is for example known that it requires fewer resources to encode a video to achieve a lessor level of quality than to achieve an average or higher level of quality. Indeed, lessor quality can be achieved when video encoding by making simple video coding decisions; however, to obtain a higher degree of video quality when encoding video, more costly decisions, such as a complex estimation of movement or complex frame partitioning, must be made. Thus, a calibrated computer process can be defined at least by a type of multimedia task, and, when applicable, the input data on which the task is performed.

After a number of calibrated computer processes have been executed on the computing machine, a determination 220 may be made as to whether an output of the computing machine matches or is better than a performance threshold. The performance threshold may be defined by one or more of a quality parameter of the output and a latency parameter between an input into the computing machine and an output from the computing machine.

Step 220 may be performed by analyzing the output of the processes run in step 210. The analysis of the output may be performed by calculating one or more quality metrics of the output of the processes. For example, a PSNR (Peak Signal Noise Ratio), SSIM (Structural SIMilarity), MS-SSIM (Multi-Scale Structural SIMilarity), Delta, MSE (Mean Squared Error), or any other standard or proprietary metric may be calculated for a video proceeded by the video encoding process performed in step 210. When applicable, such metrics may be computed on the video as a whole, or a layer of the video, for example one of the R,G,B layer of the RGB colorspace, one of the Y,U,V layer of a YUV colorspace, or any layer or combination of layers of a type of colorspace.

Thus, a calibrated computer process can be defined for example by a type of multimedia task and one or more of an input data and a threshold of quality of the result to be obtained. The quality of the result to be obtained can be expressed for example using quality parameter (such as a PSNR (Peak Signal Noise Ratio), SSIM (Structural SIMilarity), MS-SSIM (Multi-Scale Structural SIMilarity), Delta, MSE (Mean Squared Error), or any other standard or proprietary metrics of a video). The quality of the result to be obtained may also be expressed as latency between the start and the completion of a calibrated computer process. For example, one criterion for the success of a video encoding process may be achieving a video encoding with an output video having a PSNR of 40 dB in 5 seconds.

When a single computer calibrated process is running on the computing machine, step 220 may involve determining whether the output of this single process matches or is better than its performance threshold. For example, in the above example, it can be considered that the encoding of the video is successful if an output video with a PSNR equal or superior to 40 dB is obtained in 5 seconds or less.

When a plurality of computer calibrated processes are running on the computing machine, checking the output of the computing machine may involve checking if each process was successful.

The ability of a calibrated computer processes to successfully achieve its result depends not only on the process itself and the machine on which it is executed, but also on the other processes running in parallel. Indeed, when several processes run in parallel on a machine, they share the resources of a machine. For example, a video encoding process which is able to achieve a video encoding at 40 dB in 5 seconds when running alone may be forced, if a second process is running on the machine, to spare CPU resources and, as a consequence, lower the quality of encoding such that the video is encoded at a PSNR lower than 40 dB.

One of the aims of embodiments of the invention is to allow a variable number of calibrated computer processes, each having different computing loads, to run in parallel in order to verify the computing load of processes that can be run in parallel on the machine. To this effect, process 200 comprises iteratively adding or removing 230 a calibrated computer process of a selected value in the number of values of a calibrated computer load until a stop criteria defined by a required level of precision is achieved (step 240).

Step 230 involves adding or removing a calibrated computer process in order to run on the machine a number of processes having a total computing load as close as possible to the computing capacity of the machine.

In step 240, a determination is made as to whether the stop criterion has been achieved. The stop criterion is defined by a required level of precision based on the computing load. The required level of precision may be representative of the precision with which the computing capacity needs to be known. For example, a stop criterion may be achieved if, before adding a calibrated computer process having a computing load lower than the required level of precision, the output of the computer machine does not match the performance threshold, while it did not alter the addition of the calibrated computer process. On the contrary, a stop criterion may be achieved if, after the removal a calibrated computer process having a computing load lower than the required level of precision, the output of the computer machine matches the performance threshold, while it did not before the removal of the calibrated computer process.

Process 200 further comprises step 250 in which the computing capacity of the computing machine is calculated as the sum of the calibrated computing loads of the calibrated computer processes running on the computing machine when the stop criterion is achieved.

In a number of embodiments of the invention, computer processes are added in a decreasing order of computing loads, in order to progressively refine the precision of the calculation of the computing load of the computing machine. This approach may for example start with adding or removing calibrated computer processes having a predefined computing load, then, adding or removing processes with a lower computing load, and so on. In a number of embodiments of the invention, adding or removing processes with a lower computing load is performed when a switch criterion is met. In an embodiment of the invention, a switch criterion is met when n instances of a process run successfully in parallel, and, upon the addition of an $n+1^{th}$ instance, the instances of the process do not run successfully in parallel. At this stage, the estimation of the computing capacity of the machine can be further refined by running in parallel n instances of the process, and iteratively adding or removing instances of a process having a lower computing load. Examples of addition and removal of processes are provided with reference to further figures.

Various approaches are possible for determining the calibrated computing load of calibrated computing processes. In a number of embodiments of the invention, the computing load of a calibrated computer process is obtained by evaluating the number of instances of the calibrated computer process that can run in parallel on a reference computing machine having a known computing capacity, while verifying a desired output.

Figure 3A:
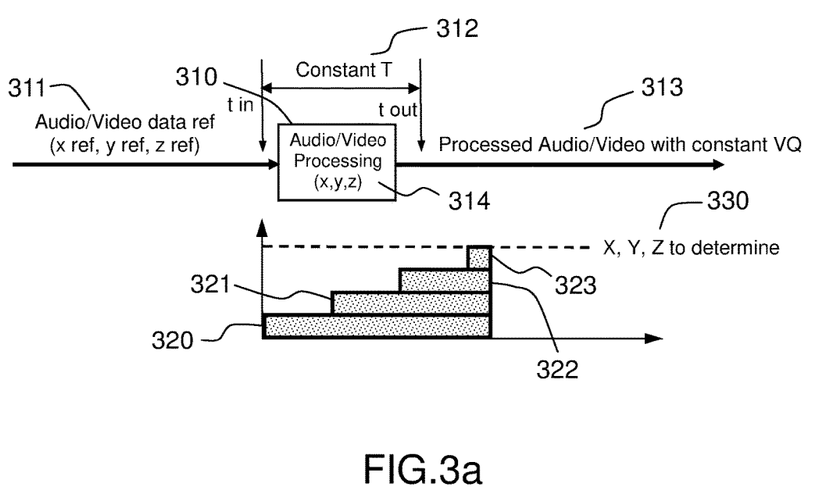
FIGS. 3a, 3b, 3c and 3d display examples of iterative addition or removal of computer calibrated processes according to various embodiments of the invention.

FIGS. 3a, 3b, 3c and 3d display examples of iterative addition or removal of computer calibrated processes according to various embodiments of the invention. FIG. 3a displays a first example of iterative addition or removal of computer calibrated processes according to an embodiment of the invention. In this example, process 200 is used for iteratively adding instances of a computer calibrated process 310 in order to determine computing capacities 330 of a target machine. The computing capacities are labeled X, Y, Z and may represent for example the CPU, the amount of RAM, and the bandwidth of the machine.

The computer calibrated process 310 is, in this example, a multimedia process, for example an image or an audio process. It is applied to input data 311. Process 310 is considered as having been successfully executed if it processed the multimedia content into a processed output 313, where processed output 313 has a level of quality equal or greater to a threshold, while having run with a latency equal or below a threshold latency 312. By means of non-limitative example, the desired quality is noted "VQ" for "Video Quality" on the figure. However, embodiments of the invention are applicable to any type of quality of any multimedia stream.

In an embodiment of the invention, four instances 320, 321, 322 and 323 of the process 310 are iteratively added to run in parallel on the target machine. After each instance of the process 310 has been added the instances of the process run in parallel for one or a plurality of iterations. A determination is then made, at the output of the target machine, if the calibrated computing process was successful, i.e., if the calibrated computing process produced a processed multimedia at a quality on or above VQ 313, with a latency on or below T 312. If a plurality of iterations of each process is performed, then the output of the process is considered as unsuccessful if at least one iteration of the process produced an unsuccessful result.

After the respective addition of the instances 320, 321, and 322, the resources of the target machine are sufficient to successfully run the instances in parallel. Thus, the instances of the process 310 produce a result with a sufficient quality at a latency equal or below the latency T 312. On the contrary, when adding the fourth instance 323, the target machine has not anymore enough resources to run the four instances in parallel. Thus, at least one of the instances does not produce the desired result. Process 200 then calculates the resources X, Y, Z of the target machine as the sum of the resources x,y,z of the instances 3120a, 321, 322 respectively, i.e., three times the resources x,y,z of the process 310 respectively.

Figure 3B:
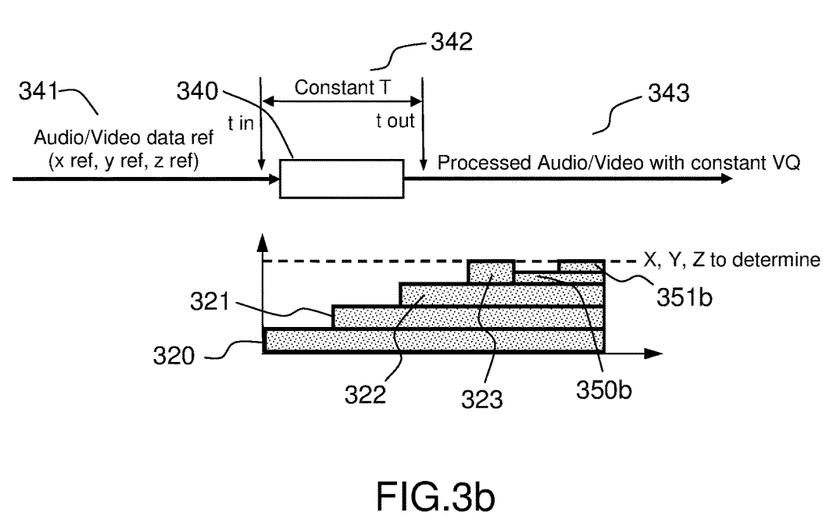

FIG. 3b displays a second example of iterative addition or removal of computer calibrated processes according to an embodiment of the invention. This second example relies on the addition and removal of instances of process 310 and of instances of a second process 340. Similarly to process 310, process 340 has input data 341, a latency 342, and a threshold of quality for the output 343. The second process 342 has also calibrated computer loads x2, y2, z2, but these calibrated computer loads are lower than the calibrated computer loads of the first process 310.

In this example, the four instances 320, 321, 322, 323 of the process 310 are added, similarly to the example depicted on FIG. 3a. After adding the fourth instance 323 of the process 310, the four instances are not able to successfully execute in parallel. In this example, the calibrated computer loads x,y,z do not match the target level of precision for the computing capacity of the machine. Instead of meeting a stop criterion, the method thus meets a switch criterion, and successively adds instances 350b and 351b of the second process 340, whose calibrated computer loads x2, y2, z2 are equal or below the target level of precision of the computing capacity of the machine.

When running the three instances 320, 321, 322 of the process 310, and the first instance 350b of the second process 340, the execution of the processes is successful: the processed multimedia content matches the desired level of quality, and the latencies of the execution are lower than the latencies 312 and 342, respectively. In contrast, after adding a second instance 351 of the process 340, the sum of the calibrated computer loads of the processes running is above the computing capacity of the machine: at least one of the instances of the processes running is not successful. Since the calibrated computer loads x2, y2, z2 of the second process are lower than the target precision, the stop criterion is met, and the computing capacities X, Y, Z of the machine is calculated as [X, Y, Z]=3*[x, y, z]+[x2, y2, z2].

In other embodiments of the invention, the calibrated computing load can be further refined by adding and removing instances of processes having even lower computer calibrated loads.

Figure 3C:
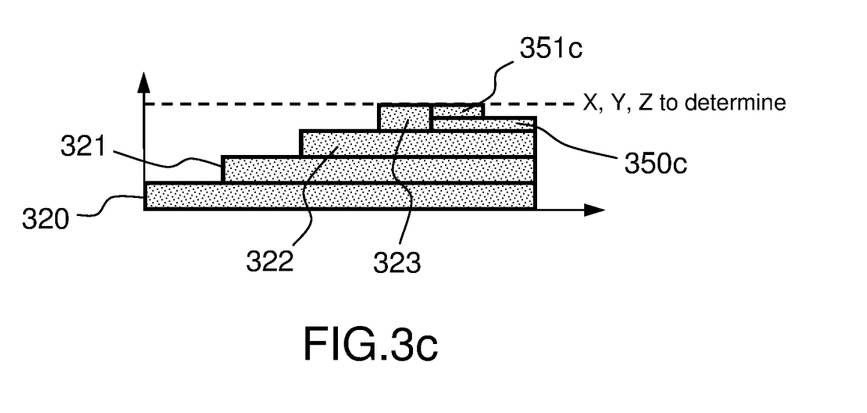

FIG. 3c displays a third example of iterative addition or removal of computer calibrated processes according to an embodiment of the invention. Similarly to the example depicted with reference to FIG. 3b, in this example instances of processes 310 and 340 are iteratively added and removed, starting from the fourth instances 320, 321, 322 and 323 of the process 310, and a switch criterion is met after the addition of the fourth instance 323 of the process 310. In this example, the computer loads x2, y2, z2 of the second process 340 are supposed to be half the computer loads x,y,z of the first process 310.

In this embodiment of the invention, once the switch criterion is met, two instances 350c, 351c of the second process 340 are added. The sum of calibrated loads of the instances of processes running being higher than the computing capacity of the machine, the desired output is not achieved. In this embodiment, instances of the second process are iteratively removed until the output of all instances of processes running matches the desired output.

In this example, instance 351c of the second process 340 is removed. Then, the instances running match the desired output, the stop criterion is met, and the computing capacities X, Y, Z of the machine is calculated as [X, Y, Z]=3*[x, y, z]+[x2, y2, z2].

Figure 3D:
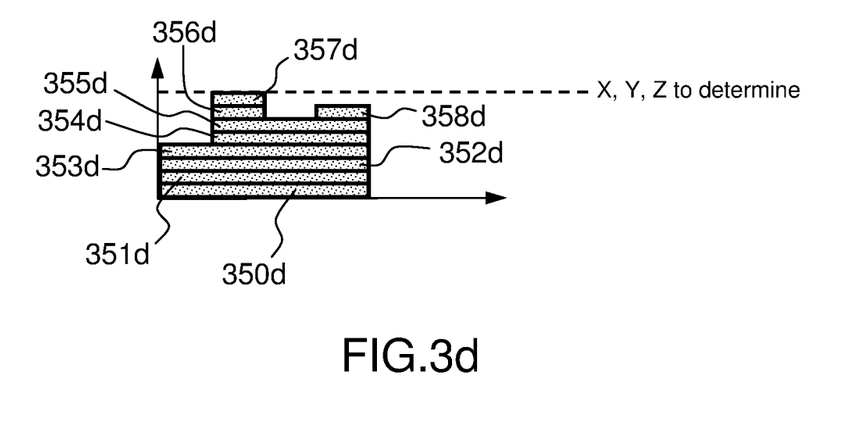

FIG. 3d displays a second example of iterative addition or removal of computer calibrated processes according to an embodiment of the invention. In this example, only instances of the second process 340 are used. In order to avoid a large number of iterations, the number of instances of the second process 340 are added or removed by groups of four instances, then two, then one.

In this example, four instances 350d, 351d, 352d, 353d of the second process 340 are initially added without exceeding the computing capacities of the machine. The correctness of the output of the process being verified, four additional instances 354d, 355d, 356d, 357d are added. After the execution of the 8 instances, the output of at least one instance of a process does not match the expected result. Then two instances, 356d and 357d, are removed. The result of the processes matches the thresholds of quality. A last instance 358d of the process 340 is added. The result of the processes matches the thresholds of quality. Thus, it can be determined that the output of 7 instances of the process 340 running in parallel on the machine match the target threshold of quality, while it had already been checked, when the instances 350d to 357d were running in parallel, that the output of 8 instances of the process 340 running in parallel does not match the target threshold of quality.

The computing capacities X, Y, Z of the machine are then calculated as [X, Y, Z]=7*[x2, y2, z2].

Embodiments of the invention are not restricted to the examples given above, as these examples of provided as non-limiting examples of certain aspects. A number of different ways of adding and removing processes are possible. For example, three or more processes of different types may be added or removed; it is possible to add or remove instances of a plurality of different processes at the same time.

Figure 4:
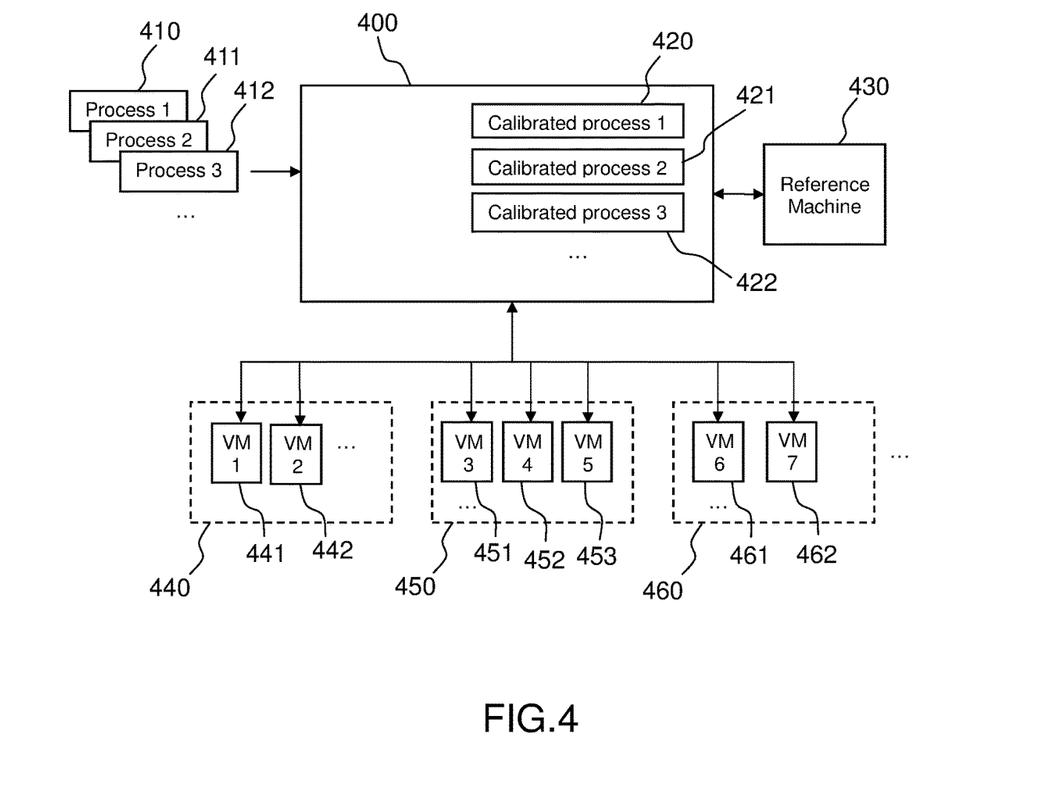
FIG. 4 displays a scheduler configured for dispatching a plurality of tasks amongst a plurality of virtual machines according to an embodiment of invention.

FIG. 4 displays a scheduler 400 configured for dispatching a plurality of tasks amongst a plurality of virtual machines according to an embodiment of invention. The scheduler displayed by FIG. 4 is provided by means of a non-limiting, illustrative example only. Notably, the example depicted by FIG. 4 is configured for dispatching tasks on virtual machines, while another scheduler according to an embodiment of the invention may dispatch tasks on physical machines.

Scheduler 400 is configured for dispatching processes, for example the processes 410, 411, 412, amongst a plurality of virtual machines. For example, it may run the processes on virtual machines 441, 442, 451, 452, 453, 461, 462, respectively running on the machines 440, 450 and 460.

In order to dispatch the processes in an efficient way, scheduler 400 uses process 200 according to embodiments of the invention in order to estimate a computing capacity of the virtual machines 441, 442, 451, 452, 453, 461, 462. Scheduler 400 may for example use the computer calibrated process 420, 421 and 422, which have been calibrated on the reference machine 430 in order to estimate the computing capacity of the virtual machines. The computer calibrated process may for example be retrieved from of a database, to which the scheduler has access, for example according to the computing loads of the process, or the type of task performed by the process.

In a number of embodiments of the invention, scheduler 400 performs process 200 on each new virtual machine in order to know permanently the computing capacity of each available machine.

In a number of embodiments of the invention, scheduler 400 stores the computing capacity of each machine, and the sum of the computing loads of the processes running on it. For each new computing process to execute, scheduler 400 computes the corresponding computing load, and executes the process on one of the available virtual machines according to the computing load of the new process to execute and the available computing capacity of each machine.

The computing load of the new computing process to execute can for example be calculated by running a number of instances of the new process on the reference machine 430 until it is not able to execute successfully.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted.

Likewise, the order of the above-described processes may be changed. The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A non-transitory computer-readable storage medium storing one or more sequences of instructions for estimating a computing capacity of a computing machine, said computing machine being one of a physical computing machine, a virtual computing machine, or a partition of either said physical computing machine or said virtual computing machine, wherein execution of the one or more sequences of instructions by one or more processors cause:

executing a number of calibrated computer processes on the computing machine, wherein each of the calibrated computer processes has a calibrated computing load defined by one or more of a CPU load, a memory load, or a bandwidth load, and wherein each calibrated computing load has a number of values;

determining whether an output of the computing machine meets or exceeds a performance threshold defined by one or more of (a) a video quality parameter of the output and (b) a latency parameter between an input into the computing machine and an output from the computing machine;

iteratively adding or removing a calibrated computer process of a selected value in the number of values of a calibrated computer load until a stop criterion defined by a required level of precision is achieved; and calculating the computing capacity of the computing machine as a sum of the calibrated computer loads of the calibrated computer processes executing on the computing machine when the stop criterion is achieved.

2. The non-transitory computer-readable storage medium of claim 1, wherein the stop criterion is determined to be achieved when (a) at least one process output of a particular calibrated computer process does not match or is better than a performance threshold after adding a calibrated computer process having a computer load equal or lower than a threshold computer load, or (b) each process output of each calibrated computer process matches or is better than the performance threshold after removing a certain calibrated computer process having a computer load equal or lower than the threshold computer load.

3. The non-transitory computer-readable storage medium of claim 1, wherein iteratively adding or removing a calibrated computer process is performed by adding or removing a plurality of different calibrated computer processes having different loads.

4. The non-transitory computer-readable storage medium of claim 3, wherein calibrated computer processes are added or removed in a decreasing order of computing loads, and wherein switching from iteratively adding or removing calibrated computer process having a calibrated computing load to iteratively a adding or removing calibrated computer process having a lower computing load is performed when a switch criterion is met.

5. The non-transitory computer-readable storage medium of claim 4, wherein the switch criteria is determined to be achieved when (a) at least one of the outputs of a calibrated computer process does not match nor is better than a performance threshold after adding a calibrated computer process, or (b) each output of each calibrated computer process matches or is better than a performance threshold after removing a calibrated computer process.

6. The non-transitory computer-readable storage medium of claim 1, wherein a computing capacity is calculated for a plurality of different sets of calibrated computer processes, and the computing capacity having the minimum value amongst said calculated computing capacities is associated to the computing machine.

7. The non-transitory computer-readable storage medium of claim 1, wherein execution of the one or more sequences of instructions further cause:

determining the computing load of a calibrated computer process by performing:

executing, on a reference computing machine, a number of instances of said calibrated computer process, said reference machine having a reference computing capacity, determining whether an output of the reference computing machine matches or is better than a performance threshold defined by one or more of (a) a video quality parameter of the output and (b) a latency parameter between an input into the computing machine and an output from the computing machine, iteratively adding or removing an instance of the calibrated computer process of a selected value in the number of values of a calibrated computer load until a stop criterion is achieved, and calculating the computing load of the calibrated computer process as the reference computing capacity divided by the number of instances of the calibrated computer processes running on the reference computing machine when the stop criteria is achieved.

8. The non-transitory computer-readable storage medium of claim 1, wherein at least one of the calibrated computer processes is a multimedia computer process.

9. The non-transitory computer-readable storage medium of claim 8, wherein said at least one calibrated computer process is a process for performing one of: video compression, audio compression, DRM application, filtering, packaging, and video pre-processing.

10. The non-transitory computer-readable storage medium of claim 8, wherein at least two of the calibrated processes are multimedia processes for performing a same multimedia task on two different sets of input data.

11. An apparatus for estimating a computing capacity of a computing machine, said computing machine being one of a physical computing machine, a virtual computing machine, or a partition of either said physical computing machine or said virtual computing machine, comprising:

one or more processors; and one or more non-transitory computer-readable storage mediums storing one or more sequences of instructions, which when executed, cause:

executing a number of calibrated computer processes on the computing machine, wherein each of the calibrated computer processes has a calibrated computing load defined by one or more of a CPU load, a memory load, or a bandwidth load, and wherein each calibrated computing load has a number of values;

determining whether an output of the computing machine meets or exceeds a performance threshold defined by one or more of (a) a video quality parameter of the output and (b) a latency parameter between an input into the computing machine and an output from the computing machine;

iteratively adding or removing a calibrated computer process of a selected value in the number of values of a calibrated computer load until a stop criterion defined by a required level of precision is achieved; and calculating the computing capacity of the computing machine as a sum of the calibrated computer loads of the calibrated computer processes executing on the computing machine when the stop criterion is achieved.

12. The apparatus of claim 11, wherein the stop criterion is determined to be achieved when (a) at least one process output of a particular calibrated computer process does not match or is better than a performance threshold after adding a calibrated computer process having a computer load equal or lower than a threshold computer load, or (b) each process output of each calibrated computer process matches or is better than the performance threshold after removing a certain calibrated computer process having a computer load equal or lower than the threshold computer load.

13. The apparatus of claim 11, wherein iteratively adding or removing a calibrated computer process is performed by adding or removing a plurality of different calibrated computer processes having different loads.

14. The apparatus of claim 13, wherein calibrated computer processes are added or removed in a decreasing order of computing loads, and wherein switching from iteratively adding or removing calibrated computer process having a calibrated computing load to iteratively a adding or removing calibrated computer process having a lower computing load is performed when a switch criterion is met.

15. The apparatus of claim 14, wherein the switch criteria is determined to be achieved when (a) at least one of the outputs of a calibrated computer process does not match nor is better than a performance threshold after adding a calibrated computer process, or (b) each output of each calibrated computer process matches or is better than a performance threshold after removing a calibrated computer process.

16. The apparatus of claim 11, wherein a computing capacity is calculated for a plurality of different sets of calibrated computer processes, and the computing capacity having the minimum value amongst said calculated computing capacities is associated to the computing machine.

17. The apparatus of claim 11, wherein execution of the one or more sequences of instructions further cause:

determining the computing load of a calibrated computer process by performing:

executing, on a reference computing machine, a number of instances of said calibrated computer process, said reference machine having a reference computing capacity, determining whether an output of the reference computing machine matches or is better than a performance threshold defined by one or more of (a) a video quality parameter of the output and (b) a latency parameter between an input into the computing machine and an output from the computing machine, iteratively adding or removing an instance of the calibrated computer process of a selected value in the number of values of a calibrated computer load until a stop criterion is achieved, and calculating the computing load of the calibrated computer process as the reference computing capacity divided by the number of instances of the calibrated computer processes running on the reference computing machine when the stop criteria is achieved.

18. The apparatus of claim 11, wherein at least one of the calibrated computer processes is a multimedia computer process.

19. The apparatus of claim 18, wherein said at least one calibrated computer process is a process for performing one of: video compression, audio compression, DRM application, filtering, packaging, and video pre-processing.

20. The apparatus of claim 18, wherein at least two of the calibrated processes are multimedia processes for performing a same multimedia task on two different sets of input data.

21. A method for estimating a computing capacity of a computing machine, said computing machine being one of a physical computing machine, a virtual computing machine, or a partition of either said physical computing machine or said virtual computing machine, comprising:

executing a number of calibrated computer processes on the computing machine, wherein each of the calibrated computer processes has a calibrated computing load defined by one or more of a CPU load, a memory load, or a bandwidth load, and wherein each calibrated computing load has a number of values;

determining whether an output of the computing machine meets or exceeds a performance threshold defined by one or more of (a) a video quality parameter of the output and (b) a latency parameter between an input into the computing machine and an output from the computing machine;

iteratively adding or removing a calibrated computer process of a selected value in the number of values of a calibrated computer load until a stop criterion defined by a required level of precision is achieved; and calculating the computing capacity of the computing machine as a sum of the calibrated computer loads of the calibrated computer processes executing on the computing machine when the stop criterion is achieved.

* * * * *